Oct. 18, 1949.   A. R. BURCH   2,485,085
HAND TRUCK
Filed June 28, 1946   2 Sheets-Sheet 1
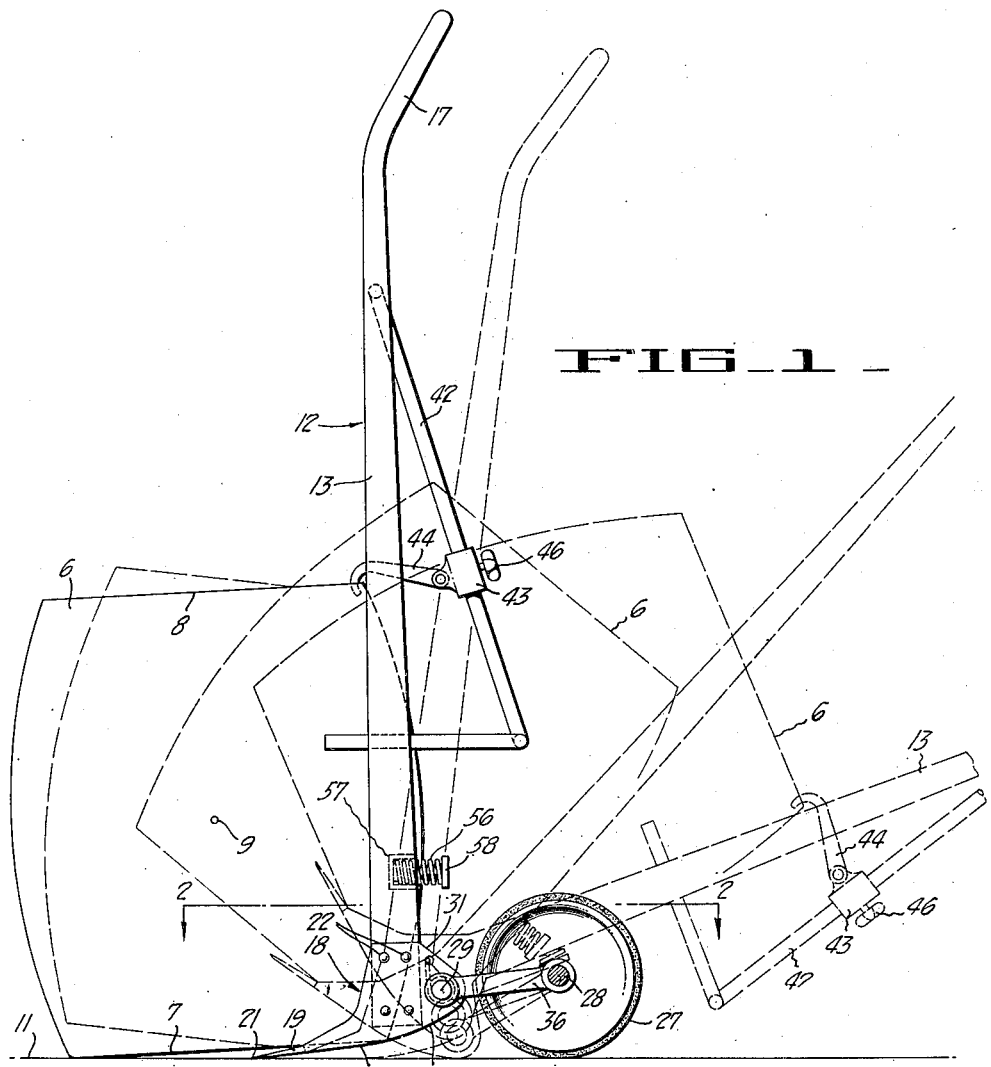
FIG_1_
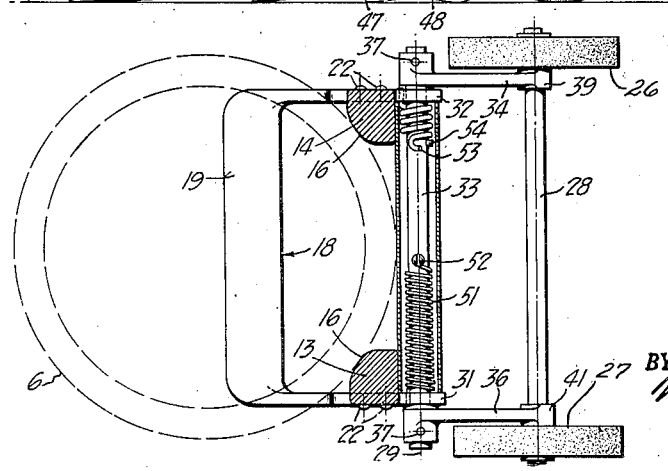
FIG_2_
INVENTOR.
Arthur R. Burch
BY Oct. 18, 1949.                A. R. BURCH                2,485,085
                              HAND TRUCK
Filed June 28, 1946                              2 Sheets-Sheet 2
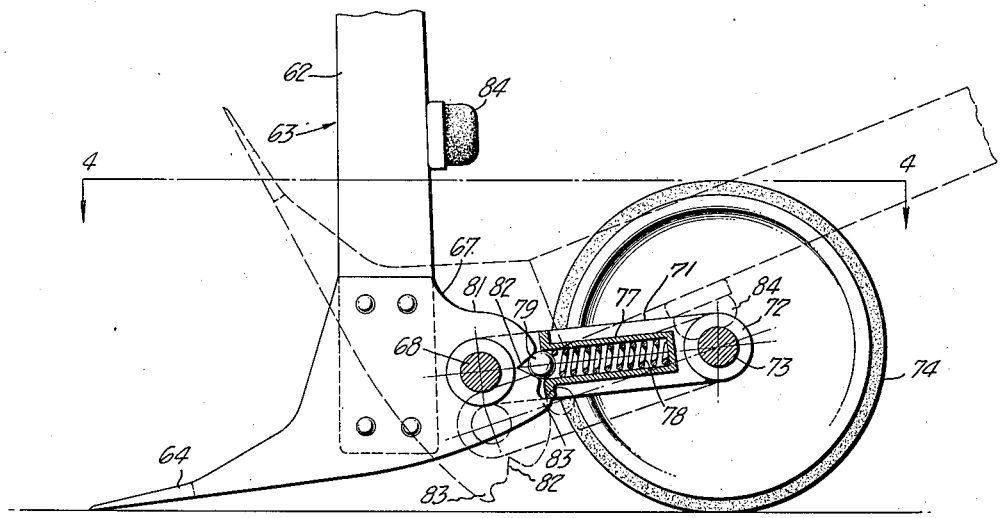
FIG_3_
FIG_4_
INVENTOR.
Arthur R. Burch
BY Patented Oct. 18, 1949

2,485,085

UNITED STATES PATENT OFFICE 2,485,085

HAND TRUCK

Arthur R. Burch, Berkeley, Calif.

Application June 28, 1946, Serial No. 680,125

1 Claim. (Cl. 280—56)

My invention relates to means for use by persons engaged in lifting, transporting and depositing heavy loads, usually packages, and for assisting them in such work. A wheeled vehicle having a frame and handle and some means of supporting the load is of the characteristics mentioned and is of the class to which my invention pertains. A device of this sort is referred to as a hand truck herein although it is capable in general of a wide variety of application.

It is customary to provide a hand truck having a frame equipped with a lip at the lower end and with a pair of wheels on an axle secured to the lower end of the frame and having a handle or handles at the upper end. In use the frame is tilted into a substantially erect or upright position while it is being engaged with a load, for example, when the lip is run under the lower flange of a barrel. During this time the wheels are lifted from the ground. Then the barrel and frame are tipped rearwardly about the lower end of the frame serving as a fulcrum until the wheels engage the ground and the loaded truck rests upon them. The loaded vehicle is then wheeled to a point of discharge, whereat the frame is again turned into a substantially upright position to deposit the load upon the supporting surface. During this motion of the hand truck the wheels are again lifted from the ground.

When a truck of this nature is not engaged with a load and is simply left to stand by itself, the truck usually rests with the frame on the ground and the wheels likewise on the ground so that the frame and handles are inclined at a considerable angle.

In some installations the truck is utilized over rather rough and uneven surfaces and is abruptly shoved from one position to another imposing very substantial strains. In the heavier trucks the very act of lifting the wheels from the ground in engaging and disengaging a load when repeated a number of times during the day becomes a source of fatigue for the operator.

It is therefore an object of my invention to provide a hand truck which is capable of utility in a very wide field of operations yet is much easier to operate than former devices.

Another object of the invention is to provide a hand truck in which it is not necessary to lift the wheels from the ground each time the truck is engaged with or disengaged from a load.

Another object of the invention is to provide means for cushioning the travel of the load over uneven surfaces.

A further object of the invention is to provide a hand truck in which the frame either remains in or assumes an upright attitude when the truck is not being utilized.

A further object of the invention is to provide means for taking care of the shifting of the load or the center of gravity of the load as it is being assumed by the hand truck and for effectuating the reverse operation when the load is released from the hand truck.

Another object of the invention is to provide a hand truck with an improved running gear incorporating means for giving greater stability to the hand truck in vertical position.

An additional object of the invention is to provide a hand truck in which the load is lifted less than the customary amount in being engaged and disposed for transportation by the hand truck.

An additional object of the invention is providing a way of counterbalancing at least part of the weight of the hand truck during its operation.

A further object of the invention is to provide a running gear for a hand truck so that the ground-engaging wheels remain in a running position and do not shift to a forward position if and when the center of gravity of the load passes to the rear of the center of the wheels.

Another object of the invention is to provide an improved hand truck.

Other objects of the invention together with the foregoing are attained in the embodiment of the invention described in the following description and illustrated in the accompanying drawings in which Figure 1 is a side elevation of one form of hand truck constructed in accordance with my invention there being disclosed in broken lines several successive operative positions of the structure.

Figure 2 is a cross section taken on the plane indicated by the line 2—2 of Figure 1.

Figure 3 is a side elevation of a modified form of hand truck constructed in accordance with my invention, a portion of this structure being broken away to show in cross section on a vertical plane a part of a spring and associated structure.

Figure 4 is a cross section taken on the plane indicated by the line 4—4 of Figure 3.

In its preferred form, the hand truck of my invention comprises a frame having a ground end and a handle at the other end, supported on a pair of ground-engaging wheels through the medium of a linkage such that the wheels and frame can bodily swing toward each other about an axis substantially at the lower or ground end of the frame and includes a structure preferably in the nature of a spring, such as a torsion spring, for resisting the approaching movement of the wheels and frame and also usually includes a resilient stop or abutment so that the weight of the frame and its load is resiliently transferred to the wheel structure.

As an example of the many embodiments of my invention, there is shown herein especially in Figures 1 and 2 a hand truck particularly adaptable for use in transporting a package such as a barrel 6. This barrel is a generally symmetrical object having a lower rim 7, an upper rim 8 and a center of gravity located approximately at the point 9. It normally rests upon a supporting surface 11 referred to herein generally as the ground.

For transporting the barrel or package, I provide a hand truck having a frame generally designated 12. The frame includes a pair of rails 13 and 14, fabricated of any suitable material such as metal or hard wood and having facing contours 16 adapted to abut a package of the type with which the truck is used normally. The rails are substantially parallel and are joined at appropriate intervals so as to provide a rigid support. Each rail at its end remote from the ground 11 is provided with a handle 17 formed of a bent and reduced portion of the rail proper and disposed in an appropriate and convenient location for engagement by the hands of an operator or user.

Adjacent its other or lower or ground end, the frame 12 is suitably joined by a spanning framework 18 having a central transverse lip 19 preferably reduced in thickness practically to a sharp edge 21 and secured to the remainder of the frame 12 by suitable fastenings 22. The effect of the framework 18 and the lip portion 19 thereof is not only to stiffen the lower portion of the frame but also to engage beneath the lower rim 7 of the package 6.

Also included in the hand truck is a ground-engaging means such as a pair of appropriately tired wheels 26 and 27 of any suitable sort appropriately journaled on an axle 28. The particular bearing connection between the axle and the wheel is of no particular consequence so long as it is suitable for normal rotary interconnection. Instead of being directly and rigidly fastened to the frame 12 as is usual practice, the axle 28, in accordance with my invention, is so joined to the frame 12 that the wheels 26 and 27 can approach the frame by a general swinging movement about an axis 29 disposed substantially at the lower end of the frame 12. For convenience, the framework 18 is provided with apertured extensions 31 and 32 through which passes a pivot shaft 33 extending beyond such ears to receive at its ends a pair of links 34 and 36 respectively secured by pins 37 to the shaft and extending to and encompassing the axle 28 by suitable bearing boxes or bosses 39 and 41.

The structure as so far described is used by running the truck up to the package 6 and inserting the lip 19 beneath the package rim 7. The package is then temporarily secured to the truck frame 12 by an adjustable fastening structure. This includes a rod 42 bent and displaced so as to be secured to the frame side rails 13 and 14 near the handles 17 and also closer to the central portion of the rails. The rod carries a central slide 43 provided with a hinged hook 44 and having a thumb screw 46 for temporarily holding the slide and the hook in any adjusted position. As illustrated in Figure 1, the hook 44 is engaged with the upper rim 8 of the package 6 and the set screw 46 is secured. Then the handles 17 are manipulated toward the right or clockwise in Figure 1 so that the center of gravity 9 of the package is shifted from its normal location in a curved path depending upon the curvature of the sole 47 and heel 48 of the ground-engaging portion of the frame 18. There results a rocking motion of the load as its center of gravity tends to come more and more over the rod 33. It is to be especially noticed that the ground-engaging wheels 26 and 27 remain on the ground and take no part in this preliminary manipulation of the load inasmuch as they are relatively freely connected to the frame 12.

In order to regulate the swinging movement of the wheels with regard to the frame, I preferably provide a means for yieldingly resisting the approaching movement of the wheels toward the frame. This means includes, preferably, a helical or torsion spring 51, one end of which is secured to the frame 18 and the other end of which is connected by a fastener 52 to the rod 33 that turns when the wheels swing. The force due to the spring 51 is preferably such that it substantially counterbalances the normal weight of the frame 12 and is effective in the usual operation of the structure when unloaded to maintain the frame in an upright position. When the frame is rotated clockwise as shown in Figure 1, the spring 51 is put under increasing tension and tends to resist gradually the motion of the frame toward the wheels thus assisting the operator by reducing the speed with which the weight of the load tends to drive the frame toward the wheels.

In the event extremely heavy loads are to be handled and additional counterbalancing is needed, it can either be built into the spring 51 itself or preferably for manufacturing reasons there is provided a supplementary torsion spring 53 at one end fastened into the frame 18 and at the other end having a lost motion connection to a stud 54 secured to the rod 33. For the initial relative rotation between the frame and the wheels no stress is placed upon the supplementary spring but eventually there is an abrupt engagement of the supplementary spring which, being relatively heavy, imposes a greatly increased resistance to further motion. This additionally assists the operator in controlling the load.

When the frame 18 and the wheel structure have substantially come together, a final means of cushioning their abutment is provided by coil springs 56 contained in suitable sockets 57 in the frame side rails 13 and 14. These have abutting caps 58 positioned to engage the axle 28 for a final resilient resistance of the approaching motion of the wheels and frame. When the springs 56 are effective, the handles 17 are substantially in their lowermost operative or transporting position.

After the load has been suitably moved, the handles are operated into the full line position as shown in Figure 1 by a counterclockwise rotation with the springs variously assisting in this action. After the parts have been restored to the positions shown in Figure 1, the hook 44 is released and the lip 19 is withdrawn from beneath the rim 7 of the package so that the truck is completely disengaged therefrom. If left to itself the truck will remain in a substantially upright or inoperative position due to the influence of the torsion spring 51.

In accordance with this embodiment of the invention therefore, there is provided a structure which is normally upright for convenience in handling, storage and accessibility and one in which it is not necessary to lift the weight of the wheels and wheel structure each time a load is engaged and further one in which counterbalancing springs are utilized to assist the operator, not only in moving the load to and in transport position, but also in returning the load from transport position to storage position.

A modified form of the arrangement is shown in Figures 3 and 4 in which the general parts of the structure are substantially the same although a different type of springing structure is utilized.

In this arrangement the frame rails 61 and 62 are included in a frame generally designated 63 along with a lip structure 64 secured to the rails. Piercing ears 66 and 67 constituting extensions of the frame 64 is a rotatable through rod 68 to which is rigidly secured a pair of links 69 and 71 respectively. At their extremities the links are enlarged to provide journal bosses 72, pierced by an axle 73 carrying ground-engaging wheels 74 and 76. With this structure the ground-engaging wheels and their associated mechanisms are swingable with regard to the main frame 63. In order to provide an appropriate relative orientation of these structures, I preferably enlarge each of the links 69 and 71 to provide a socket 77 for containing a coil spring 78 effective to urge a ball detent structure 79 against a cam surface 81 formed on the frame ears 66 and 67. The cam surface is formed with a central notch 82 and with a terminal abutment 83 and has an appropriate adjacent contour so that the force of the spring 78 is appropriately translated into the desired relative assistance or resistance to the operator's manipulation of the frame 63 relative to the wheels. As the wheel structure and frame approach each other, their ultimate abutment is abruptly and yieldingly resisted by a rubber pad 84 mounted on one or both of the frame rails 61 and 62 and in the lower position of the frame effective to contact the axle rod 73.

In this embodiment of the invention as well, the normal position of the structure is substantially upright for ease in handling and storing and it is not necessary to lift the wheels with each engagement of the lip 64 with the load. Furthermore when the frame 63 is rocked clockwise as shown in Figure 3 to approach the wheel structure, the spring 78 is, through the cam surface and ball mechanism, compressed to afford the appropriate counterbalancing of the load. This action is augmented by the rubber abutment pad 84 as the structure is moved into carrying position. Finally after the load has been transported and the frame 63 is impelled by the operator in a counter-clockwise direction toward discharge position, the spring 78 is effective through the ball and cam mechanism to assist in returning the frame 63 substantially to an upright position for release of the load and for storage purposes.

In accordance with my invention therefore, I have provided an improved hand truck facilitating the work of the operator by relieving him of considerable muscular effort particularly in repetitive operations and have further provided means especially in the nature of torsion springs for assisting in balancing the load and in storing energy in the truck structure for use when it will assist the operator. The truck is more conveniently left for storage and is in general a considerable improvement over hand trucks now available.

I claim:

A hand truck comprising an elongated frame having a handle at one end and ground engaging means at the other end, said ground engaging means being rigidly carried by said frame and defining a lowermost surface curved in a fore and aft direction when said frame is in an upright position and upon which said frame and ground engaging means are rockable from said upright position to a rearwardly inclined load-carrying position, links pivoted to said frame on a transverse axis at the rear end of said curved surface with said axis extending transversely to the direction of curvature of said surface whereby rocking of said frame on said surface will cause only slight rearward movement of said axis, said links extending rearwardly and upwardly from said axis and having ground wheels journalled to the free ends thereof, and spring means connected to said frame and said links and arranged to constantly act on said frame and links in all operative positions of said frame to swing said links about said axis in a direction to move said wheels away from the handle end of said frame, said spring having sufficient strength to normally position said wheels to hold said frame in said upright position.

ARTHUR R. BURCH.

REFERENCES CITED

The following references are of record in the file of this patent:

UNITED STATES PATENTS

| Number | Name | Date |
| --- | --- | --- |
| 356,473 | James | Jan. 25, 1887 |
| 729,931 | Hart et al. | June 2, 1903 |
| 1,201,957 | Hall | Oct. 17, 1916 |
| 1,578,602 | Heath | Mar. 30, 1926 |
| 1,725,095 | Morrow | Aug. 20, 1929 |
| 2,414,946 | Hammermiller | Jan. 28, 1947 |

FOREIGN PATENTS

| Number | Country | Date |
| --- | --- | --- |
| 1,021 | Great Britain | Apr. 29, 1909 |
| 38,991 | France | May 19, 1931 |
| 398,441 | Great Britain | Sept. 14, 1933 |